Feb. 5, 1929.　　　　　　　　　　　　　　　　　1,700,849
A. H. C. MAUL
MACHINE FOR DRESSING REEDS USED FOR CIGARETTE MOUTHPIECES
Filed Dec. 12, 1924　　　6 Sheets-Sheet 1
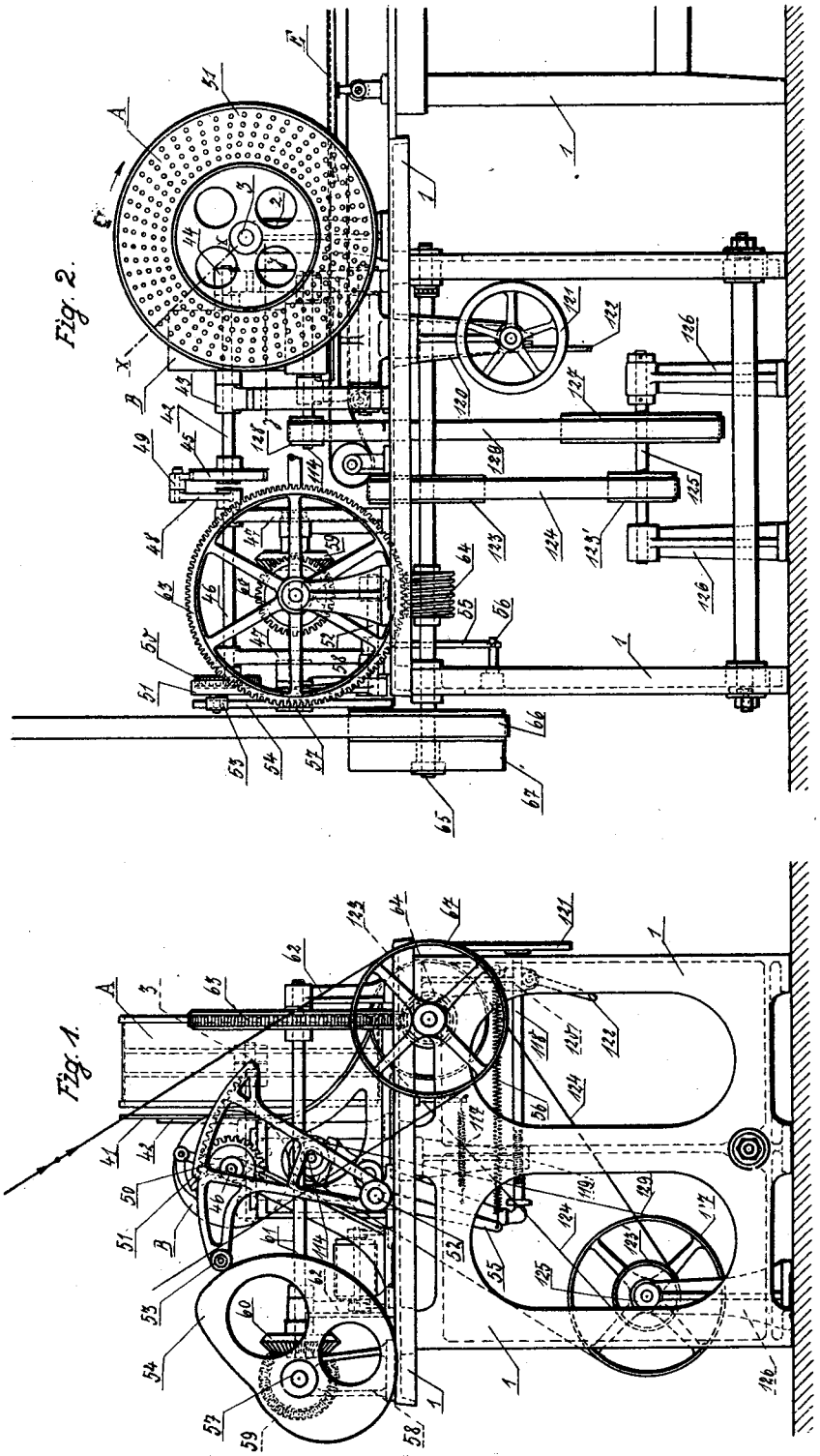

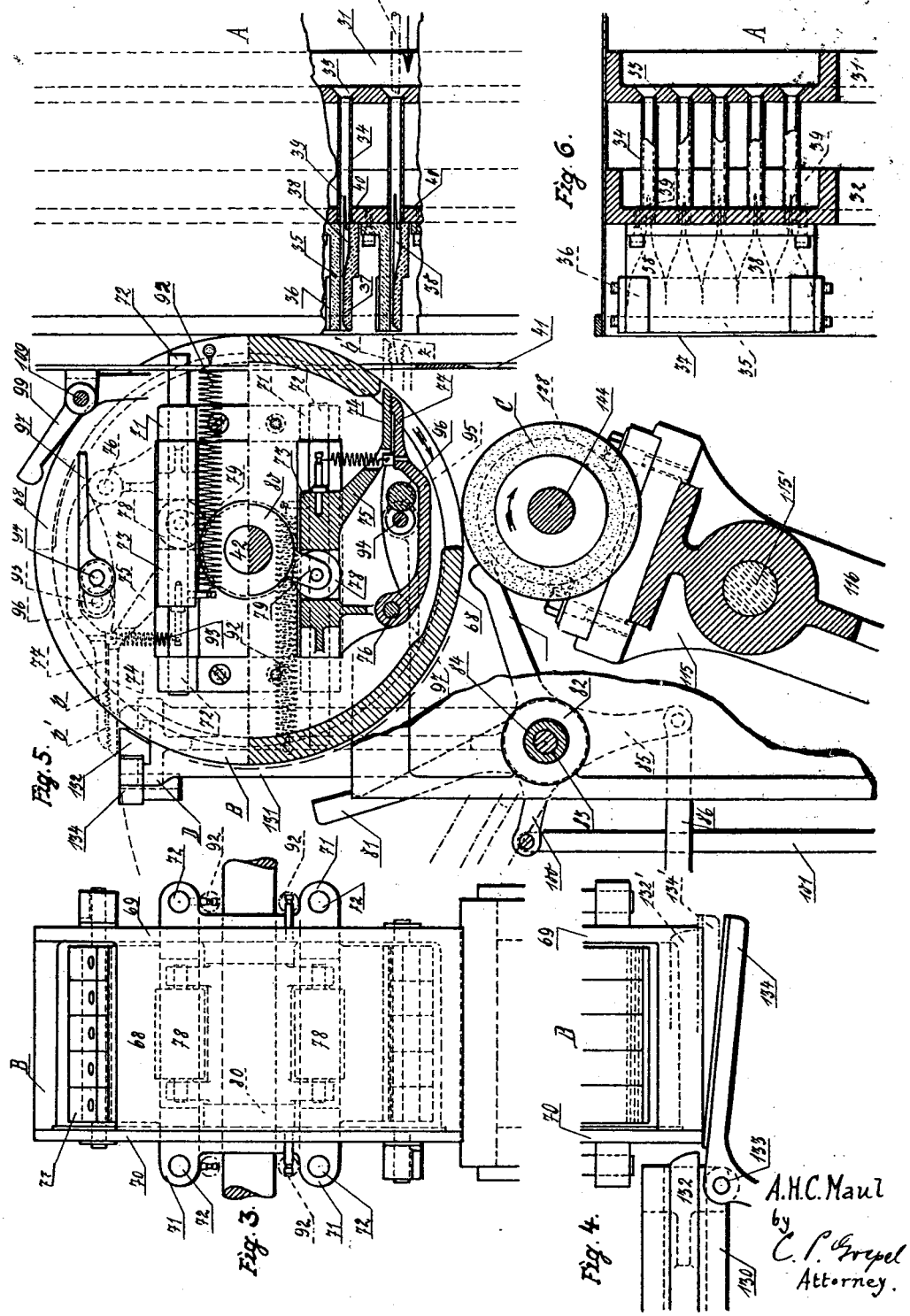

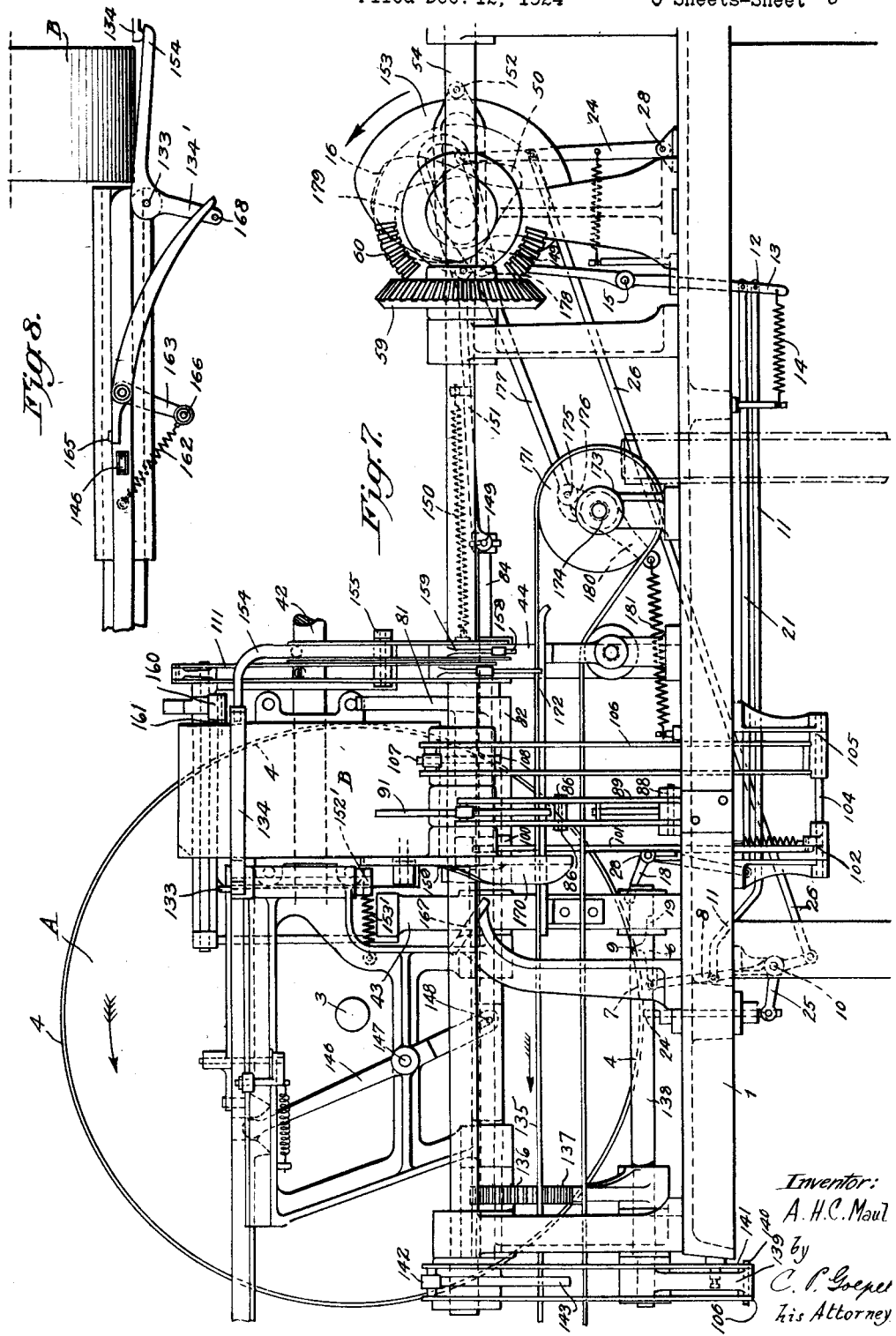

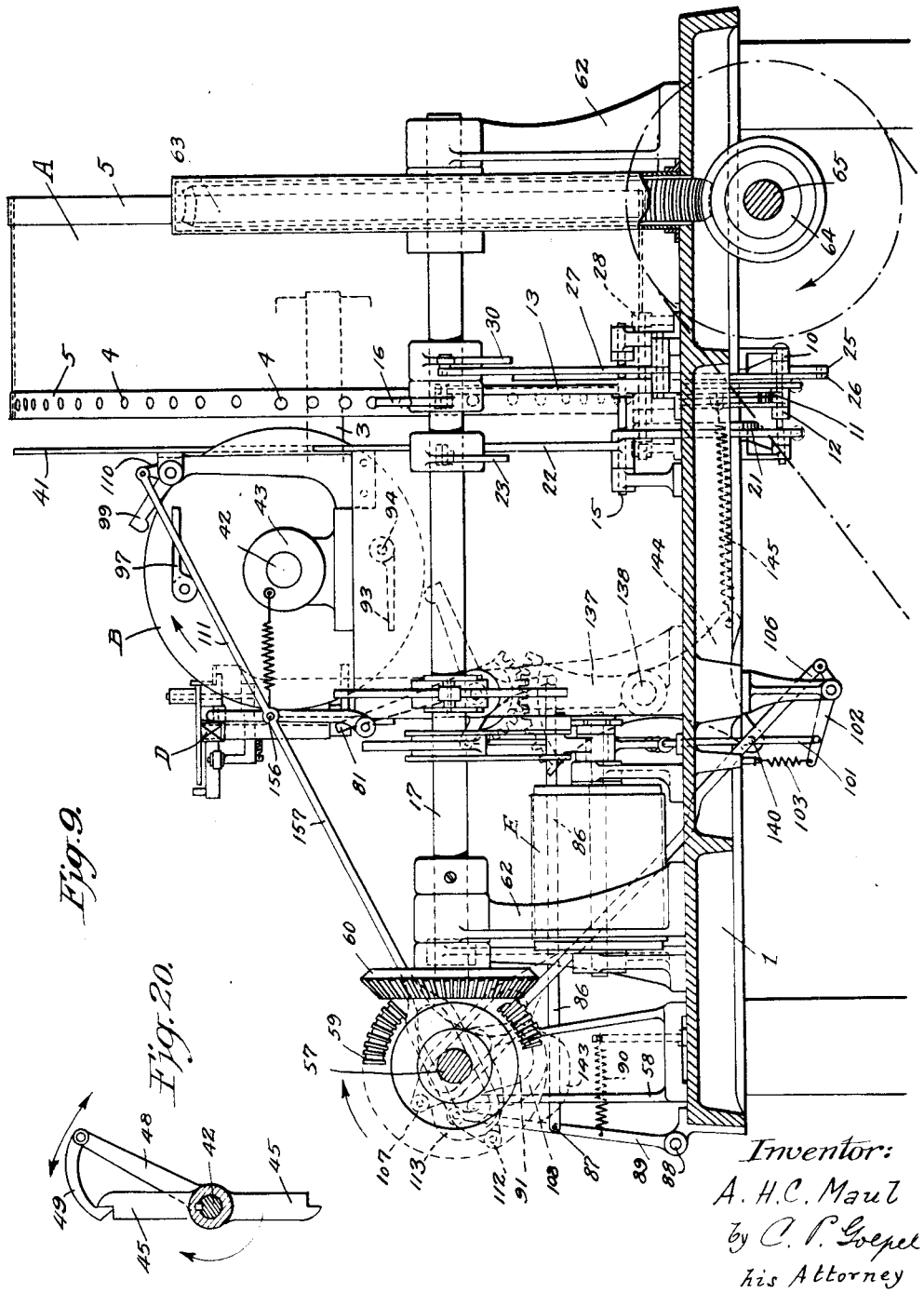

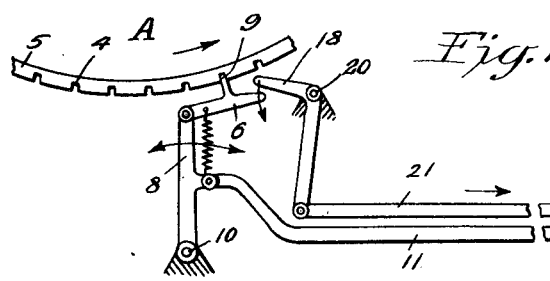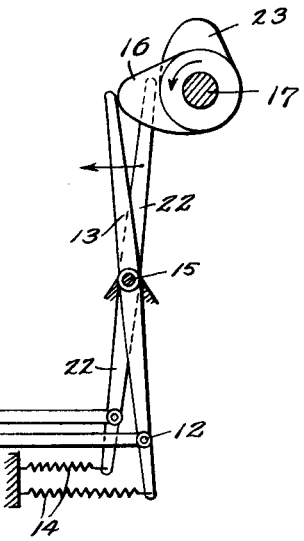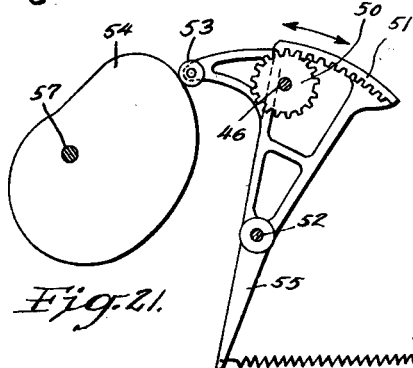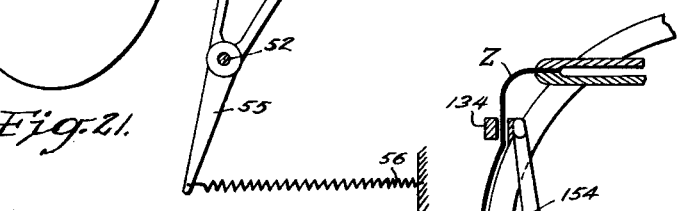

Feb. 5, 1929.   1,700,849
A. H. C. MAUL
MACHINE FOR DRESSING REEDS USED FOR CIGARETTE MOUTHPIECES
Filed Dec. 12, 1924   6 Sheets-Sheet 6

Inventor:
A. H. C. Maul
by C. P. Goepel
his Attorney

Patented Feb. 5, 1929.

1,700,849

UNITED STATES PATENT OFFICE.

ALFRED HERMANN CARL MAUL, OF DRESDEN, GERMANY, ASSIGNOR TO A. B. FISCHL, A FIRM, OF DRESDEN-LEUBNITZ, GERMANY.

MACHINE FOR DRESSING REEDS USED FOR CIGARETTE MOUTHPIECES.

Application filed December 12, 1924, Serial No. 755,357, and in Germany October 29, 1924.

This invention relates to a machine for dressing certain varieties of reeds which are being used for cigarette mouthpieces, and more particularly to the mechanical preparation of slitting and flattening the reed and removing the pith from the inside thereof.

Heretofore this preparation has been carried out by hand in a lengthy and expensive manner, whereby the worker removes the pith or core of the reed by means of a knife. In this manner it was impossible to obtain a uniform thickness of the outer layer or casing, as the depth of the cutting with the knife in the scraping operation depends upon the judgment of the worker as to the degree to which the inner core is removed as in the particular straw or reed used for the purpose there is no sharply marked difference between the inner core and the harder outer layer or casing of the reed.

According to this invention, the reeds are prepared in a machine having a feeding supply drum with its receiving end to the front of the machine and directed toward the attendant for receiving the reeds which are to be operated upon. This drum is provided with feeding apparatus which splits the reed, spreads it and flattens it out preparatory to the removal of the inner core. To the rear of this receiving or feeding supply drum is a counterdrum mounted on a shaft at right angles to the feeding supply drum. This counterdrum is provided with gripping members and is so mounted that these members will grasp the flattened ends of the reeds extending from the rear of the feeding supply drum and upon rotation of this counterdrum the reeds are drawn through the feeding supply drum and on to the counterdrum in a manner so as to protect the reeds and without danger of breaking the same during the operation of removing the inner core material and thinning of the outer layer. This latter operation is accomplished during the rotation of the counterdrum by a grinding wheel adjustably arranged adjacent to the counterdrum and operative to grind the reeds while resting against the surface of the drum to the desired thickness during their movement past the grinding wheel. After these operations on the reeds they are automatically removed from the counterdrum and conveyed from the machine.

The invention has for its main object to provide a machine of the character set forth for the slitting and flattening of reeds and the like and grinding them to an adjusted uniform thickness.

A further object of the invention is to provide mechanisms for carrying out the various steps in the process and operating mechanisms for driving the aforesaid mechanisms in the required manner and order of operation.

With the foregoing and other objects in view as will appear in the specification and claims, the invention consists of the novel construction, combination, and arrangement of parts hereinafter more specifically stated and illustrated in the accompanying drawings, wherein is shown a machine embodying the structure of the invention in its preferred form, but it is to be understood that changes, variations and modifications may be resorted to without departing from the scope of the invention.

In describing the invention in detail, reference is had to the accompanying drawings which form a part of this specification, and wherein like characters of reference indicate corresponding parts throughout the several views.

As illustrated in the drawings:

Figure 1 is a side elevation, and

Figure 2 is a front elevation of the machine,

Figure 3 is a view of the counterdrum shown from the same side as Figure 2.

Figure 4 is a plan view of a part of the counterdrum and the apparatus for removing the reeds therefrom.

Figure 5 is an enlarged elevation and section taken on the line Y—Y of Figure 2.

Figure 6 is a sectional view of a part of the feeding drum showing the splitting and flattening apparatus for the reeds.

Figure 7 is an enlarged rear elevation of the upper part of the machine.

Figure 8 is a plan view of a part of the counterdrum and apparatus for removing the reeds, similar to the showing in Figure 4, and

Figure 9 is a vertical longitudinal sectional view through the supporting table showing parts of the machine in elevation, as shown in Figure 1.

Figure 14:
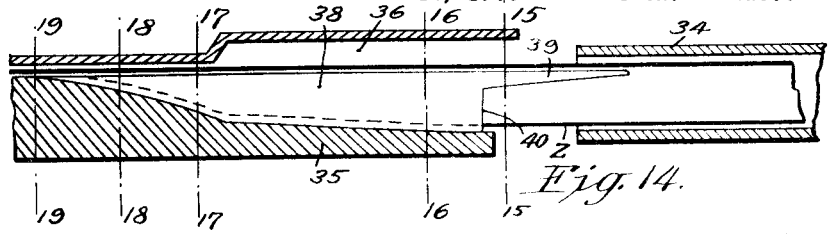
Figure 15:
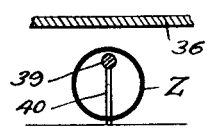
Figure 16:
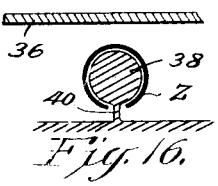
Figure 17:
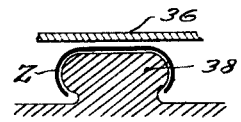
Figure 18:
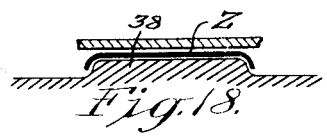
Figure 19:
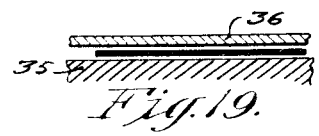

Figure 10 is a detail enlarged elevation of the intermittent drive mechanism for the drum, Figures 11, 12 and 13 are details of the catcher operating devices, showing the same in top plan, side elevation and front elevation respectively, Figure 14 is a longitudinal section of the cutting and spraying mechanism for the reels, Figures 15 to 19, inclusive, are cross sections through Figure 14 on the respective sections as indicated.

Figures 20 and 21 show detail enlarged views of the drum operating mechanism.

Figure 22:
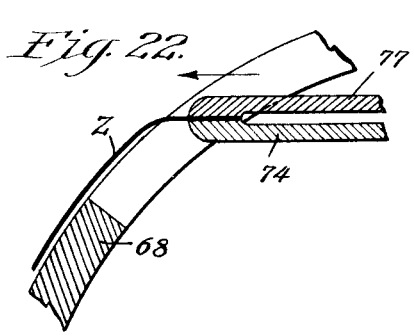
Figure 23:
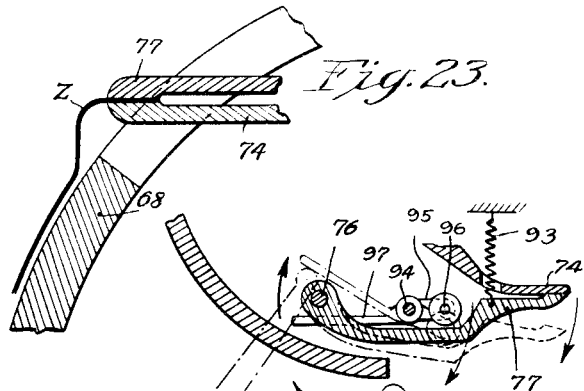
Figure 24:
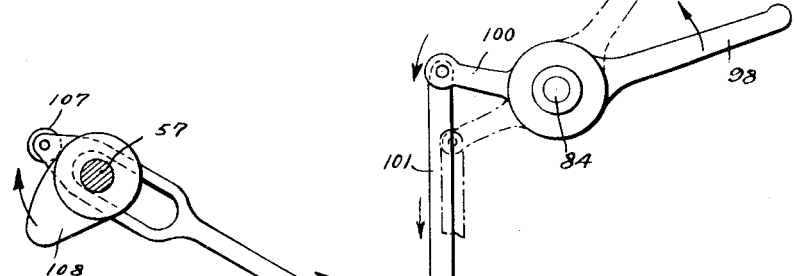

Figures 22 and 23 show detail enlarged sections of the catcher in its relation to the drum, and Figure 24 is an enlarged detail view of the control mechanism for the catchers.

Referring to the drawings, and particularly to Figures 1 and 2, the machine comprises mainly a feeding drum A, which is mounted on a shaft 3 journaled in bearings 2 carried by the supporting frame 1. This drum has its front receiving end to the front of the machine directed toward the operator for receiving reeds Z to be operated upon; it is provided with splitting and spreading apparatus which will hereinafter be described in detail. To the rear of drum A, a counterdrum B is mounted on its shaft 42, at right angles to the shaft 3 for drum A; this drum withdraws the reeds in their flattened shape from drum A and carries them on for the grinding operation. This operation is accomplished by a grinding wheel or disk C, which is located substantially under drum B and is adjustably mounted so that the reeds may be ground down to any desired thickness. Beyond drum B, on the opposite side from drum A, is apparatus D, for removing and cutting the ground reeds Z, and apparatus E, for discharging them from the machine, these two being generally shown best in Figure 9.

In the operation of the machine the drum A will be successively turned at distinct intervals with a step by step motion so as to bring the series of feeding apertures, generally shown best in Figure 2, successively into the horizontal position indicated by line Y—Y to place these apertures in a position to be engaged by the counterdrum B, as will hereinafter be set forth. The rim 5 of the drum A is therefore provided with holes 4, arranged at regular distances from each other. (Figure 9.) These holes 4 are adapted to be grasped by a pawl or pin 6, as shown in Figure 7, which pin is connected by a pivot 7 to the lever 8. This pin 6 is pressed by means of a spring (not shown in the drawings) against the drum so that its projection 9 enters in one of the holes 4. The lever 8 is journalled on a pin 10 carried by the support 1 and is connected with the pullrod 11, which in turn is connected by means of a pin 12 with a lever 13. Lever 13 is pivoted at 15 and a spring 14 acting at its lower end causes its upper end to engage against a cam 16, which is mounted on a shaft 17. Upon rotation of cam 16, the pin 6 will be moved to the right side from the position shown and the drum will be turned so as to bring the next series of apertures into position along line Y—Y, Figure 2. At the proper moment, after this partial turning of the drum, the angular lever 18, which in one position presses on the projection 19 of the pin 6, will be released. The lever 18 is journaled on pin 20 carried on frame 1 and is connected by a rod 21 with a lever 22, which has a follower that engages with a second cam 23.

Before the projection 19 of the pin 6 leaves one of the holes 4, the bolt 24 enters another of the holes 4, which lies further behind than the first mentioned hole. The bolt 24 is carried in a guide block on the plate of the support 1. The lower end of this bolt 24 is connected with the angular lever 25, which is also journaled on the pivot 10. The lever 25 is connected by a rod 26 with the lever 27, which is pivoted at 28 above the support and which by means of the spring 29 is drawn against the circumference of a third cam 30 on the shaft 17.

The front end of the drum A consists of two disks 31 and 32 which, as shown in Figure 6, are provided with the series of apertures for receiving the reeds, which are arranged in nearly radial rows. The apertures in both disks conform with each other and the apertures in the front disk 31 are countersunk, as shown by 33, so as to facilitate the placing of the reeds in them. Pipes 34 are arranged in the apertures and extend between these disks, connecting the same in a manner for receiving the reeds which are introduced into them and then pushed in the direction of the arrow (Figure 5).

The splitting and spreading or flattening apparatus is arranged in the back part of the drum A. Preferably each series of apertures is provided with apparatus arranged directly behind each of the series of apertures in the disks. This apparatus comprises a number of plates 35 secured to disks 31 and 32. One is positioned along each series of apertures in the disks 31 and 32 with its lower side tangential with respect to the inner diameter of the pipes 34. These plates 35 carry by means of sideward extending projections 36, plates 37. These plates form in connection with the plates 35 chambers in their front part of a height which corresponds with the inner diameter of the pipes 34. The surfaces of the plates 37 are formed in such a manner so that the chambers will be gradually narrowed in the direction to the back part of the drum, forming at that point a flat slit. From the surfaces of the plates 37, projections 38, forming conical mandrels 39 extend into the pipes 34. Beneath these mandrels the projections 38 are formed with cutting edges 40.

The operator feeds the drum A with reeds by inserting them into the pipes 34 of the drum which lie below the line Y—Y in the section bounded by the lines Y—Y and X—X in Figure 2. All the reeds eventually come to the position Y—Y during the successive movement of the drum in the direction of the arrow, from which position they will be automatically guided to the next step of the preparation as hereinafter described. The operator has to push the reeds until they reach the fixedly mounted sheet-metal plate 41, which has the same outline as the drum A. This plate 41 is mounted on the bearings 2 by means of arms 41[1] extending therefrom (Figure 1). During insertion of the reeds they are positioned on the mandrels 39, whereby they will be guided from the inside. During the further inward movement, the reeds pass the knife edges 40 on the projections 38, which split the reeds and after passing the edges 40 the split reeds enter the chambers between the plates 35 and 37 where they will be gradually flattened, and on further movement their flat ends will project from the drum A and come into engagement with the wall 41.

The further preparation of the split and flattened reeds takes place on the counter drum B. This drum is secured on a shaft 42, which is rotatably mounted in the bearings 43 and 44. The counterdrum B is successively rotated through 180°. The shaft 42 is provided for this purpose with two lever arms 45, which are displaced 180°, Figures 1 and 2. In alinement with the shaft 42, is a shaft 46 which is journaled in bearings 47. The shaft 46 receives an oscillating movement of 180°. On the end of the shaft 46, which is turned to the shaft 42, is mounted an arm 48 with a pawl 49, which during each oscillation of the shaft 46 in one direction grasps one of the arms 45 and turns it through 180°. On the outer end of the shaft 46 is mounted a gear wheel 50 which engages inner teeth on a segment 51. The segment 51 is mounted on a shaft 52 and the two are oscillated by means of a cam 50 which is engaged by a roll 53 carried by the segment, and due to the cam's uninterrupted rotation in the same direction, it acts to oscillate the segment 51. The shaft 52 is further provided with a lever arm 55, to which is secured a spring 56, which acts to maintain the segment with its roller in engagement with the cam 54. The axle 57 on which the cam 54 is secured, is mounted in the bearings 58 and is provided with a bevel gear wheel 59, which meshes with a bevel gear wheel 60 on the shaft 61. The shaft 61 is mounted in the bearings 62 and carries, furthermore, a worm wheel 63. Meshing with the worm wheel is a worm 64 which is on the main driving shaft 65. This shaft 65 is journaled in bearings carried by the support 1 and is provided with a driving pulley 66 and a loose pulley 67.

The counterdrum B has two peripheral parts 68 interrupted by gaps. These parts are adapted to serve as beds for the flattened reeds during the grinding operation. In these gaps, between the two peripheral parts are arranged catchers, which act to catch the outstanding ends of a transverse row of reeds and hold the same during the further preparation thereof. In each gap are as many catchers arranged as there are apertures in a transverse row of the drum A.

The drum B consists of a body 69 and a cover plate 70 (Figure 3). Arranged on each of the outer ends of drum B are four slide bearings 71, which afford slidable mountings for rods 72. Shoes 73 are securely fastened on these rods 72, and are provided with extending members which are movable through suitable openings in the side walls of the drum. These members are preferably shaped, as shown in the lower part of the drum, in Figure 5. Each shoe 73 has a part 75 which extends across the interior of the drum, and has formed integral therewith an end member or plate 74, which provides one jaw of the catcher for the whole row of reeds in the Y—Y plane. Mounted on a pivot 76 carried by the part 75 is a movable catcher jaw 77. The shoes 73 are actuated by means of rollers 78 which extend into openings within the part 75 for receiving them and against which they act. These rollers are mounted between arms 79 extending from a hub 80, which is loosely mounted on shaft 42 as a pivotal support. Thus the hub 80 with its arms 79 forms a two-arm lever, whereby when one of the lever rods 72 with the corresponding shoe 73 with its catcher is moved outward, the motion will be transmitted to the other to push its catcher outward, which position is indicated in dotted lines in Figure 5. The return movement of the shoes 73 to the inner position, shown in full lines, is effected by means of springs 92 located outside of the drum B, one end of each of the springs being connected with one of the shoes and the other ends of the springs with bolts which extend from the drum, as shown in connection with the upper half of the drum.

This outward movement of the catchers will be caused by the lever arm 81. This lever arm is mounted on the nave or box 82, which embraces a freely rotatable hollow shaft 83 and a rod 84, which slides in this shaft 83; these latter parts and their bearings will be more fully described hereinafter. An arm 85 of the lever 81 is connected with the rod 86 which, as shown in Figure 9, is connected at 87 with the lever 89, which lever is mounted on a pivot 88 carried by the supporting base 1. A spring 90 acts to maintain the lever 89 with its following roller against the cam 91 on the shaft 57.

Owing to the varying thicknesses of the reeds projecting from feeding drum A, each reed should be provided with individual gripping means. Therefore a plurality of movable catcher jaws 77 are provided for cooperating with each jaw 74, as indicated in Figure 3. As shown in Figure 5, springs 93 are secured to jaws 73 and jaws 77 for holding the jaws in their gripping relation. In the position shown in Figure 5, both catcher sets must be opened, the lower set for the purpose of catching the outstanding ends of the reeds Z in the plane Y—Y referred to, and the upper set for the purpose of releasing the reeds which have been ground. The shafts 94 are therefore arranged in the inner part of the drum and are provided with short lever arms 95 which carry rollers 96 which extend across the drum and engage all of the movable catcher jaws 73. Outside of the drum, connected with the shafts 94, are arranged the lever arms 97, which are actuated by the levers 98 and 99 for opening the jaw members at the proper time during the periods when the counter drum is stationary.

The lever 98 is mounted on a second nave or box which embraces freely and rotatably the parts 83 and 84. This box has an arm 100 which is connected with a lever arm 102 by the rod 101 (Figure 9). A spring 103 normally draws the lever arm 102 upwards. On the axle 104 of the lever arm 102 is further arranged the short lever arm 105, which is connected with a rod 106. This rod 106 surrounds the shaft 57 with a loop and rests with the roller 107 on the periphery of the cam 108. The lever 99 is actuated in similar manner. This lever is mounted on the shaft 109 which is connected with the rod 111 by a short lever arm 110. The front end of the rod 111 forming a loop surrounds the shaft 57 and is provided with a roller 112, which rests on the cam 113.

The catcher set in the lower portion of the drum, as shown in Figure 5, is in a position to grip the flattened ends of the reeds, and by the action of the springs 92 during the backward movement of the lever arm 81 draws the reeds inwardly, and as the drum B is rotated withdraws the reeds entirely from the drum A. The reeds will lay during this rotation of drum B on the peripheral parts 68 of the drum. The reeds held in this manner will now be further prepared by the grinding disk C during the half rotation of the drum B.

The grinding disk C is mounted with its axle 144 on the adjustable support 115, which is rotatable around the axle 115'. This axle 115' is mounted in bearings carried by support 1. The end 116 of the adjustable support 115 rests against the end of a screw spindle 118 under the action of a spring 117. This spindle has its female thread supported in a bearing pedestal 119 and beyond the threaded portion is rotatably supported in a second bearing pedestal 120. The distance between the grinding disk and the drum B can be very accurately adjusted by means of a hand wheel 121 and secured by clamping the spindle 118. For this purpose the bearing in the pedestal 120 is slotted and this slot can be closed in the known manner by means of a screw with hand lever 122. The grinding disk C is rotated at a high speed by the driving shaft 65 operating through an intermediate shaft 125. This shaft 125 is mounted in the bearing pedestals 126 and is driven by belt 124 on the pulleys 123 and 123' and connected with the axle 115' of the grinding disk C by a belt 129 on the pulleys 127 and 128.

At the end of a half turn of the counter drum B, during which the reeds are ground by the grinding disk C, the situation is as follows:—

The catcher set which first stands in a position marked with $b$ is moved through 180° to the position $b'$, Figure 5; the drum then stands still. Next the lever 81 oscillates forward through the drum and by engaging the rods 72 pushes the lower catcher 77 against the feeding drum A. The catcher having been previously opened by the lever 98 acting upon the lever arm 97. The lever 79 causes the lower catcher to be pushed out to the right and the upper catcher to be pushed out to the left side simultaneously, but the upper catcher jaws are pushed out in a closed condition, after which the lever 99 acts on the upper lever arm 97. The ground reeds are held by their front end in the catcher and lie on the peripheral part 68 of the drum B. By the passing of the reeds between the drum B and grinding disk C all air which may be between the reeds and the drum is removed so that the ground reeds adhere to the drum. A loosening of the reeds by hand would have to be done very carefully as the reeds would otherwise break. As the catcher 77 moves outwards from the drum in a closed condition, the reeds will be gradually loosened from the drum and form a curve, as shown by dotted line in Figure 5. This curved loop formation will be used in mechanically removing of the reeds from the drum B.

Adjacent to the side of drum B is a guide member 130, which is mounted on a support 131, in a manner whereby this member 130 can be oscillated through an arc of approximately 90°. This support 131 is carried by the hollow axle 83 (Figure 5). The guide member oscillates between the position shown in Figures 7 and 9 to nearly a horizontal position. During the removing of the reeds the guide member is in an upright position.

The guide member 130 slidingly carries a rod 132. The side of the rod 132 toward the drum B is so shaped that it corresponds with the periphery of the drum. When the rod 132 moves forward in the guide member 130, it enters the curved formation of the reeds and moves between it and the drum B; then the catcher 134 which is formed as an angular lever and connected by means of a pin 133 on the guide member 130 is closed on the reeds from the outside, so that the reeds are held between the rod 132 and the catcher 134. This position is shown in dotted lines in Figure 4, marked with 132' and 134'. By a downward oscillation of the support 131 the reeds will be brought over the conveyor 135 (Figure 7), which will carry them to a place where they can be removed from the machine by the operator. In the lower position of the oscillating support 131 a cutting operation on the reeds takes place. The oscillating movement of the support 131 with the guide member 130 is accomplished by the toothed segments 136 and 137. The segment 136 is secured on the hollow shaft 83 and the segment 137 is fastened on the shaft 138 (Figure 9). The shaft 138 receives an oscillating movement by means of the lever arm 139 which is mounted on the end of the shaft 138. The lever arm 139 is connected by means of a pin 140 with a rod 141 (Figure 7), which rod, as shown in Figure 9, is directly behind a portion of the rod 106, and similarly to rod 106, rod 141 is provided with a roller 142 which rests on the cam 143 on the end of shaft 57. The oscillating movement of the rod 132 in the guide member 130 is accomplished by the lever 146 which is pivotally connected at 147 on the oscillating support. The lower end of the lever 146 is connected with a transverse pin 148 which extends from rod 84 out through a longitudinal slot in the hollow shaft 83. As previously stated, rod 84 is slidingly mounted in the hollow shaft 83 and by means of rod 151 is given an oscillating movement, rod 151 being connected by means of a pin 149 to the rod 84. A spring 150 secured to rod 151 yieldingly draws these members toward the left side (Figure 7). This rod 151 ends in a loop and is provided with a roller 152, which engages with a cam 153, mounted on the shaft 17. The shaft 133 of the catcher 134 is journaled in the oscillating support 131 and carries at its lower end an arm 152', and a spring 153' connected with this arm operates to close the catcher. The catcher 134 is held against the action of the spring 153', as shown in Figures 6, 11 and 12 until the catcher 73 leaves the inner part of the drum B, so that the catcher 134 will prevent the forming of a loop at the ends of the reeds. For this purpose a lever 154 is provided for actuating the catcher 134 to an open position; this lever 154 is mounted on a pivot 155 extending from the upwardly extending pedestal 43. Its upper portion is curved in a manner so that it can engage behind the end of catcher 134. When the rod 132 has entered the curved part of the reeds, the lever 154 will be operated to disengage the catcher 134. The lever 154 will be moved for this purpose by a rod 157 which is connected to the lever by a pin 156. As shown in Figure 9, this rod 157 extends directly in front of the left part of the rod 111. The end of rod 157 is also formed as a loop and is provided with a roller 158 which is engaged on a cam 159, mounted on the shaft 57.

For cutting off the parts of the reeds which were held by the catchers in the drum and which therefore are not ground, the sharp edges of the rod 132 act together with a blade 160 as cutting scissors. The blade 160 with its axle pin 161 is pivotally mounted on the rod 132. On the lower end of the pin 161 is an arm 163 to which a spring 162 is connected. The spring pulls on arm 163 of the blade 160 against a stop 165 projecting from the rod 132. The scissors close during the downward oscillation of the support 131 as the roller 166 on the arm 163 passes along a sloping surface 167 formed on a support in the path of the oscillating support 131 (Figure 7).

During the downward oscillation of the support 131 the catching members formed by the rod 132 and the catcher 134 must be opened, so that the reeds are freed and can fall upon the band 135 of the conveyor E. The pin 168 on the arm 134' slides, during the downward oscillation of the support 131, along the curve 169 of a cam 170, which is mounted on the shaft 57.

The band 135 runs over a pulley 171 and a second pulley (not shown in the drawing) outside the machine. This band will be supported by a plate 172 opposite the drum B, and will be moved step by step in the direction of the arrow (Figure 7) by a ratchet wheel 173 on the pulley shaft 174 and a pawl 175 which is pivotally mounted on the shaft 174, and is provided with an oscillating lever member 176. A rod 177 has one end connected with lever 176 and its other end is formed into a loop extending around shaft 17 and is provided with a roller 178 which engages the cam 179, which causes the forward movement of the ratchet wheel. The backward movement of the pawl lever 176 is caused by a spring 181, which is connected with the arm 180 of the pawl lever 176.

Figure 10 illustrates the mechanism of the pawl 6 and is seen in the same direction as in Figure 7. This figure shows the position of the pawl drive in the moment where pawl 6 moves drum A one division further. The two arm lever 18 presses with one of its ends on the projection of pawl 6 so that projection 9 of the pawl will be moved from hole 4. The pawl will now be moved back again and slips under pressure of a spring in the following hole 4 after which the pawl moves drum A again one division. The two arm lever 18 is pivoted at 20 and is rocked by a curved disk 23 and rods 22 and 21. Spring 14 presses the upper end of the two arm lever 22 against curved disc 16. The oscillating movement of the pawl carrier 8 which is pivoted at 10 is caused by curved disc 16 by means of rods 13 and 11 having also a fixed turning point at 15. The upper end of the two arm lever 13 is also pressed against the curved disc by a spring 14.

Figures 11, 12 and 13 show lever 154 and its driving mechanism in top, side and front view.

Top view, Figure 11, shows the movement where the bent end of lever 154 allows the catcher 134 to move toward rod 132 as indicated by the arrow, whereby catcher 132 and 134 have closed themselves.

Lever 154 is at 155 pivoted on a part 44 of the machine support. At 156 a rod 157 is forked while its other end is slotted to surround the shaft 57. On shaft 57 is mounted a curved disc 159 on which acts a roll mounted on rod 157. Therefore, rod 157 and lever 154 move back and forth so that lever 154 releases catcher 134 at the proper moment and as above described the members 134 and 132 close. Now as hereinbefore clearly explained, the frame 131 can move downwardly into a horizontal position and thereby lift the reeds 2 from the drum.

Figures 14, 15, 16, 17, 18 and 19 show the cutting and spraying device for the reeds.

In Figure 14, 40 indicates the cutting edge, which cuts the reed at its lower part, 39 indicates the mandrel which catches the reed and feeds it to the cutting edge 40. Due to the formation of part 38, the reed will gradually be flattened and stretched by the spring like part 36.

Figure 20 shows the lever arms on shaft 42, 180° displaced and the arm 48 with the hook pawl 49 which turns the lever arms 45, 180° further displaced.

Figure 21 shows the curved disk 54 on which bears the roll 53 on a sector shaped racked body 51 receiving an oscillating movement by the toothed wheel 50. Toothed wheel 50 is keyed to shaft 46 on the end of which the arm 48 is fastened. This arm moves, by means of pawl 49 at each operation, one of the ends of the double armed lever 45, 180° forwards, and then returns; therefore with each stroke, the drum is advanced a half turn.

In Figure 22 the catchers 74 and 77 are in their inner position and in Figure 23 they are moved outwardly so that the reed z forms a curve or loop into which the rod 132 slips (see Fig. 5).

The control mechanism for the catchers 74 and 77 is shown in Figure 24. 74 indicates the catcher jaw rigidly connected to the drum and common to all reeds while 77 is one of the movable catcher jaws of which only one at a time catches a reed and presses it to the upper jaw 74. The movable jaws 77 are pulled to the jaw 74 by means of springs 93 one end of which is rigidly connected with the drum. A two arm lever 97 causes the jaws to open. This lever is pivoted and carries on its shorter end a roll 96. In case the two arm lever 97 is moved upwardly by one of the ends of the two arm lever 98 so that it takes the position indicated in dotted lines in Figure 24, the short lever arm with roll 96 moves downwardly and presses jaw 77, which is pivoted at 76, into the position indicated in dotted lines, so that the catcher opens. Double arm lever 98 is connected with its other end 100 to rod 101, which acts at the end 102 on a further double arm lever which is pulled upwardly by a spring 103. With the other lever arm 105 is connected rod 106 which embraces shaft 57 like a loop and carries a roll 107 which bears on curved disk 108. The arm 98 of lever 100 must be outside the drum when in resting position so that when the catchers 74 and 77 are closed and the drum turns 180°, the parts cannot come together.

What is claimed as the invention and is desired to be secured by Letters Patent is:

1. A machine for dressing reeds and the like comprising in combination, a feeding drum having a receiving end provided with apertures for receiving the reeds, means for splitting and flattening the reeds placed in the feeding drum, a counterdrum to the rear of the receiving drum, having means for gripping the ends of the reeds and withdrawing them from the receiving drum, and means adjacent to the counterdrum for dressing the reeds as this drum is rotated.

2. A machine for dressing reeds and the like comprising in combination, a feeding drum having a receiving end provided with a plurality of apertures through which the reeds are to be projected, means for splitting and flattening each reed as it is projected through an aperture in the receiving drum, and means to the rear of the drum providing an abutment for gauging the amount the reeds are to be extended rearwardly of the drum in the feeding operation.

3. A machine for dressing reeds and the like comprising in combination, a feeding drum having a receiving end provided with a plurality of apertures through which the reeds are to be projected, means for splitting and flattening each reed as it is projected through an aperture in the receiving drum, and means to the rear of the drum for gripping the flattened projecting ends of the reeds, drawing them through the feeding drum and dressing the inner surfaces of the reeds.

4. A machine for dressing reeds and the like comprising in combination, a feeding drum having a receiving end provided with a plurality of apertures through which the reeds are to be projected, a counterdrum to the rear of and arranged with its axis at right angles to the feeding drum whereby the periphery of the counterdrum will provide a bed, means within the counterdrum for gripping the ends of reeds projected through the feeding drum, and means for rotating the counterdrum for drawing the reeds through the feeding drum.

5. A machine for dressing reeds and the like comprising in combination, a feeding drum having a receiving end provided with a plurality of apertures through which the reeds are to be projected, a counterdrum to the rear of and arranged with its axis at right angles to the feeding drum whereby the periphery of the counterdrum will provide a bed, means within the counterdrum for gripping the ends of reeds projected through the feeding drum, means for rotating the counterdrum for drawing the reeds through the feeding drum, and means adjacent to the counterdrum for dressing the inner surface of the flattened reeds as the counterdrum is rotated.

6. A machine for dressing reeds and the like comprising in combination, a feeding drum having a receiving end provided with a plurality of apertures through which the reeds are to be projected, a counterdrum to the rear of and arranged with its axis at right angles to the feeding drum whereby the periphery of the counterdrum will provide a bed, means within the counterdrum for gripping the ends of reeds projected through the feeding drum, means for rotating the counterdrum for drawing the reeds through the feeding drum, means adjacent to the counterdrum for dressing the inner surface of the flattened reeds as the counterdrum is rotated, and means for releasing and removing the reeds from the counterdrum after said dressing operation.

7. A machine for dressing reeds and the like comprising in combination, a feeding device into which the reeds are projected and prepared for a dressing operation by splitting and flattening them, means for splitting and flattening the reeds, an operating drum having a periphery providing a bed for the reeds, gripping jaws within said drum, means for projecting said jaws outwardly through jaw apertures in the periphery of the drum and causing them to grip the ends of reeds projecting from said feeding device, and means for rotating the drum so as to withdraw the reeds from the feeding device.

8. A machine for dressing reeds and the like comprising in combination, a feeding device into which the reeds are projected and prepared for a dressing operation by splitting and flattening them, means for splitting and flattening the reeds, an operating drum having a periphery providing a bed for the reeds, gripping jaws within said drum, means for projecting said jaws outwardly through apertures in the periphery of the drum and causing them to grip the ends of reeds projecting from said feeding device, means for rotating the drum so as to withdraw the reeds from the feeding device, and means for opening said gripping jaws and removing the reeds from the bed of the drum after the reeds have been withdrawn from the feeding device.

9. A machine for dressing reeds and the like comprising in combination, a feeding device into which the reeds are projected and prepared for a dressing operation by splitting and flattening them, means for splitting and flattening the reeds, an operating drum having a periphery providing a bed for the reeds, gripping jaws within said drum, means for projecting said jaws outwardly through apertures in the periphery of the drum and causing them to grip the ends of reeds projecting from said feeding device, means for rotating the drum so as to withdraw the reeds from the feeding device, and a grinding disc adjacent to the bed surface of the operating drum adapted to dress the inner surface of the reeds positioned on the bed as the drum is rotated.

10. A machine for dressing reeds and the like comprising in combination, a feeding device into which the reeds are projected and prepared for a dressing operation by splitting and flattening them, means for splitting and flattening the reeds, an operating drum having a periphery providing a bed for the reeds, gripping jaws within said drum, means for projecting said jaws outwardly through apertures in the periphery of the drum and causing them to grip the ends of reeds projecting from said feeding device, means for rotating the drum so as to withdraw the reeds from the feeding device, a grinding disc adjacent to the bed surface of the operating drum adapted to dress the inner surface of the reeds positioned on the bed as the drum is rotated, and means for removing the reeds from the bed of the drum after said grinding operation.

11. In a machine of the character described, in combination, a feeding mechanism on one side, a rotary drum having a periphery providing a bed for material and having jaw members for gripping the material in the feeding mechanism, means for rotating said drum to withdraw the material from the feeding mechanism, and material removing means on the other side of the drum adapted to grip the material carried by the drum when the jaws are rotated to the required position and to withdraw the material from the bed of the drum.

12. In a machine of the character described, in combination, a feeding mechanism on one side, a rotary drum having a periphery providing a bed for material and having jaw members for gripping the material in the feeding mechanism, means for rotating said drum to withdraw the material from the feeding mechanism, a grinding disc adjacent to the periphery bed of said drum for dressing the material carried thereon, means for adjusting the position of the grinding disc with respect thereto for dressing the material to the required thickness, and material removing means on the other side of the drum adapted to grip the material carried by the drum when the jaws are rotated to the required position, and to withdraw the material from the bed of the drum.

13. In a machine of the character described, a feeding drum having a front end comprising a feeding face provided with a plurality of apertures for receiving reeds or the like, and a cutting and flattening device in the drum to the rear of each of said apertures comprising a mandrel for piercing the centre of the reed, a cutting edge for splitting the reed along one radius thereof, and a curved cavity beyond said mandrel and cutting edge which tapers in a manner to flatten the reeds and ends in a flat slot through which the reeds are to be projected.

14. In a machine of the character described, a feeding drum having a front end comprising a feeding face provided with a plurality of apertures for receiving reeds or the like, a cutting and flattening device in the drum to the rear of each of said apertures comprising a mandrel for piercing the centre of the reed, a cutting edge for splitting the reed along one radius thereof, and a curved cavity beyond said mandrel and cutting edge which tapers in a manner to flatten the reed and ends in a flat slot through which the reeds are to be projected, and means for rotating the drum with a step by step motion so as to bring the apertures successively into positions in which the reeds may be withdrawn from the drum through the slots in the rear face of the drum.

15. In a machine of the character described, comprising a feeding mechanism provided with a plurality of apertures for receiving reeds or the like, cutting and flattening means in the drum in the rear of each of said apertures, an operating drum with a peripheral surface interrupted by two openings across it, whereby two beds for material are provided, two sets of gripping jaws within the drum, means for projecting said jaw members through said openings to grip the material, means for returning them to their inner position and means for rotating the drum.

16. In a machine of the character described comprising a feeding drum provided with a plurality of apertures for receiving reeds or the like, cutting and flattening devices in the drum to the rear of said apertures, an operating drum adjacent the feeding drum with a peripheral surface interrupted by two openings across it, whereby two beds for material are provided, two sets of gripping jaws within the drum, means for projecting said jaw members through said openings to grip material by one set of jaws and project the material held by the other set of jaws outwardly simultaneously, means for returning both sets of jaws to their inner position, means for rotating the drum with a step by step motion so as to change the stationary position of the two sets of jaw members at the end of each rotary motion of the drum, and gripping means adapted to cooperate with the material on the drum.

17. In a machine of the character described comprising a feeding drum provided with a plurality of apertures for receiving reeds or the like, a cutting and flattening device in the drum to the rear of each of said apertures, an operating drum with a peripheral surface interrupted by two openings across it whereby two beds for material are provided, two sets of gripping jaw members within the drum, end walls for the drum, each having a pair of slots, extensions on the sides of each of the gripping jaw members, each extending through one of said slots in the end walls of the drum, a lever within the casing connecting both sets of jaw members so as to cause them to be moved simultaneously, and means outside of the drum adapted to engage one of the extensions from the jaw members to project the jaw members through said openings between the peripheral beds of the drum, and grinding means to operate upon the material on the drum.

18. In a machine of the character described comprising a feeding drum provided with a plurality of apertures for receiving reeds or the like, a cutting and flattening device in the drum to the rear of each of said apertures, an operating drum with a peripheral surface interrupted by two openings across it whereby two beds for material are provided, two sets of gripping jaw members within the drum, end walls for the drum, each having a pair of slots, extensions on the sides of each of the gripping jaw members, each extending through one of said slots in the end walls of the drum, a lever within the casing connecting both sets of jaw members so as to cause them to be moved simultaneously, means outside of the drum adapted to engage one of the extensions from the jaw members to project the jaw members through said openings between the peripheral beds of the drum, means for opening one set of jaw members for gripping material to be received upon a bed of the drum, and means for opening the other set of jaw members for releasing material therefrom, and a grinding disk adapted to operate upon the material on the drum.

19. A machine of the character described, comprising in combination, a feeding mechanism, a cutting and flattening mechanism carried by the feeding mechanism, an operating drum having means for gripping material in the feeding mechanism, means for rotating said drum so as to withdraw the material from said feeding mechanism and carry it on the periphery of the drum, means for projecting the end of the material outwardly from the drum on the side opposite from said feeding mechanism, means adapted to grip the end portion of the material projected outwardly from the drum and swing away from the drum so as to remove the material from the periphery thereof, and a conveyor adjacent to the drum adapted to receive the material after it is removed from the drum.

20. A machine of the character described, comprising in combination, feeding mechanism, a cutting and flattening mechanism carried by the feeding mechanism, an operating drum having means for gripping and withdrawing material from the feeding mechanism, means for rotating the drum with a step by step motion, means for removing the material from the drum and depositing it, a conveyor adjacent to the drum for receiving the material so deposited, and means for moving the conveyor with a step by step motion corresponding to the motion of the drum whereby the material will be moved along from the drum as it is deposited on the conveyor.

21. A machine of the character described, comprising in combination, feeding mechanism, a cutting and flattening mechanism carried by the feeding mechanism, an operating drum having means for gripping and withdrawing material from the feeding mechanism, means for rotating the drum, means for removing the material from the drum and depositing it, a conveyor adjacent to the drum for receiving the material so deposited comprising a belt, a supporting table arranged under a portion of the conveyor belt, and means for moving the conveyor belt as the material is deposited thereon.

22. In a machine of the character described, including a feeding mechanism, a cutting and flattening mechanism carried by the feeding mechanism, operating drum and material gripping members thereon, a removing mechanism for material on the drum comprising an oscillating guide support, a rod slidingly mounted in said support, means for projecting said rod across the periphery of the drum on one side of material carried thereby, a clamping member carried by the support, means for clamping the material between said member and said rod, and means for oscillating the support so as to withdraw the material from the drum.

23. In a machine of the character described, including a feeding mechanism, operating drum and material gripping members thereon, a removing mechanism for material on the drum comprising an oscillating guide support, a rod slidingly mounted in said support, means for projecting said rod across the periphery of the drum on one side of material carried thereby, a clamping member carried by the support, means for clamping the material between said member and said rod, means for oscillating the support so as to withdraw the material from the drum, a cutting blade carried by said rod, and means cooperating with said blade as the support is tilted downwardly to move the blade across the rod for cutting off the end of material above the rod.

In testimony that I claim the foregoing as my invention, I have signed my name hereto.

ALFRED HERMANN CARL MAUL.